(12) United States Patent
Mizuno et al.

(10) Patent No.: US 11,787,353 B2
(45) Date of Patent: Oct. 17, 2023

(54) WIRE HARNESS FIXING STRUCTURE AND WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Shigeki Ikeda, Mie (JP); Haruka Nakano, Mie (JP); Tetsuya Nishimura, Mie (JP); Masaki Mizushita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/940,961

(22) Filed: Jul. 28, 2020

(65) Prior Publication Data

US 2020/0361404 A1 Nov. 19, 2020

Related U.S. Application Data

(63) Continuation of application No. 16/607,496, filed as application No. PCT/JP2018/017147 on Apr. 27, 2018, now Pat. No. 10,759,360.

(30) Foreign Application Priority Data

May 10, 2017 (JP) ................................. 2017-094006

(51) Int. Cl.
*B60R 16/02* (2006.01)
*H02G 3/30* (2006.01)
*F16B 19/00* (2006.01)

(52) U.S. Cl.
CPC ........... *B60R 16/0215* (2013.01); *H02G 3/30* (2013.01)

(58) Field of Classification Search
CPC .. B60R 16/0215; B60R 16/0207; H02G 3/30; H02G 3/32
See application file for complete search history.

(56) References Cited

U.S. PATENT DOCUMENTS 3,733,428 A * 5/1973 Fry ...................... H01B 7/0846
156/290
5,965,951 A * 10/1999 Moore ................ B60R 16/0207
156/304.4

(Continued)

FOREIGN PATENT DOCUMENTS

CN 104080655 A 10/2014
CN 104871383 A 8/2015

(Continued)

OTHER PUBLICATIONS

Japanese Office Action, Japanese Patent Office, Application No. 2017-094006, issued Sep. 29, 2020, English translation.

(Continued)

*Primary Examiner* — Hoa C Nguyen
*Assistant Examiner* — Amol H Patel
(74) *Attorney, Agent, or Firm* — GREENBLUM & BERNSTEIN, P.L.C.

(57) ABSTRACT

A wire harness fixing structure includes a plate-like member including a first layer and a second layer softer than the first layer, an electrical wire disposed along the plate-like member, and a fixing member attached to the electrical wire to fix (Continued)

the electrical wire to the plate-like member. The fixing member includes: a through locking piece formed to be able to pass through the first layer and locked to the first layer while passing through the first layer, a regulation piece provided with a space between the regulation piece and the through locking piece to stop the through locking piece from passing through a surface of the plate-like member, and a column connecting the through locking piece and the regulation piece.

5 Claims, 9 Drawing Sheets

(56) References Cited

U.S. PATENT DOCUMENTS

| | | | | |
|---|---|---|---|---|
| 10,508,756 | B1* | 12/2019 | Sagnella | E04H 15/62 |
| 2003/0047649 | A1* | 3/2003 | Miescher | F16L 3/11 |
| | | | | 248/58 |
| 2003/0075646 | A1* | 4/2003 | Womack | H02G 3/30 |
| | | | | 248/49 |
| 2007/0063111 | A1* | 3/2007 | Alloway | B60R 16/0207 |
| | | | | 248/71 |
| 2012/0030980 | A1* | 2/2012 | Sella | B60R 21/215 |
| | | | | 40/663 |
| 2013/0292159 | A1* | 11/2013 | Gotou | H02G 3/305 |
| | | | | 174/250 |
| 2014/0086704 | A1* | 3/2014 | Hemingway | B29C 35/0805 |
| | | | | 411/392 |
| 2014/0251683 | A1 | 9/2014 | Yamamoto et al. | |
| 2015/0107748 | A1* | 4/2015 | Suzuki | H02G 3/0487 |
| | | | | 156/438 |
| 2015/0283962 | A1* | 10/2015 | Kobayashi | H02G 3/32 |
| | | | | 174/72 A |
| 2015/0321625 | A1 | 11/2015 | Sato et al. | |
| 2015/0329069 | A1* | 11/2015 | Daugherty | B60R 16/0207 |
| | | | | 174/72 A |
| 2016/0046245 | A1* | 2/2016 | Kajiwara | F16L 3/137 |
| | | | | 248/71 |
| 2016/0121821 | A1* | 5/2016 | Suzuki | B60R 16/0215 |
| | | | | 296/97.23 |
| 2016/0339852 | A1* | 11/2016 | Linan | B60R 16/0215 |
| 2017/0110864 | A1 | 4/2017 | Akahane et al. | |
| 2017/0129424 | A1* | 5/2017 | Nagahashi | H02G 3/0468 |
| 2017/0297516 | A1* | 10/2017 | Loebe | F16L 3/1075 |
| 2017/0327060 | A1* | 11/2017 | Nakajima | H01B 13/01254 |
| 2018/0022289 | A1* | 1/2018 | Ishida | B60R 11/00 |
| | | | | 24/453 |
| 2018/0172052 | A1* | 6/2018 | Gray | F16B 15/08 |
| 2019/0111859 | A1* | 4/2019 | Kumamoto | B60R 13/0225 |
| 2019/0287696 | A1 | 9/2019 | Mizuno et al. | |
| 2019/0375348 | A1 | 12/2019 | Mizuno et al. | |
| 2019/0392963 | A1 | 12/2019 | Ishida et al. | |

FOREIGN PATENT DOCUMENTS

| | | | |
|---|---|---|---|
| CN | 105501148 | A | 4/2016 |
| JP | 58-192408 | | 12/1983 |
| JP | 5-207628 | | 8/1993 |
| JP | 6-85914 | | 12/1994 |
| JP | 9-277853 | | 10/1997 |
| JP | 10-154425 | | 6/1998 |
| JP | 2000-335329 | | 12/2000 |
| JP | 2001-216848 | A | 8/2001 |
| JP | 2001-334888 | | 12/2001 |
| JP | 2002-19545 | | 1/2002 |
| JP | 2002-249004 | | 9/2002 |
| JP | 2004-306741 | | 11/2004 |
| JP | 2006-318884 | | 11/2006 |
| JP | 2009-96336 | | 5/2009 |
| JP | 2012-10474 | | 1/2012 |
| JP | 2014-136536 | A | 7/2014 |
| JP | 2015-200363 | A | 11/2015 |
| JP | 2016-116370 | A | 6/2016 |
| JP | 2016-139551 | | 8/2016 |
| JP | 2016139551 | A * | 8/2016 |

OTHER PUBLICATIONS

Office Action issued in Japan, Application No. 2020-090529, dated Nov. 2, 2021, English translation.
Office Action, Japan Patent Office, in counterpart Japan Patent Application No. 2020-090529, issued on Apr. 5, 2022 (with English translation).
Office Action, Japan Patent Office, in counterpart Japanese Patent Application No. 2020-090529, issued on Jun. 22, 2021, (with English translation).
Japanese Office Action, in counterpart Japanese Patent Application No. 2022-105581, issued on Mar. 7, 2023, with English translation.
International Search Report issued in International Patent Application No. PCT/JP2018/017147, dated Jun. 26, 2018 (in English).
U.S. Appl. No. 16/605,638 to MIZUNO et al., which was filed on Oct. 16, 2019.
U.S. Appl. No. 16/609,322 to MIZUSHITA et al., which was filed on Oct. 29, 2019.
U.S. Appl. No. 16/614,963 to MIZUNO et al., which was filed on Nov. 19, 2019.
U.S. Appl. No. 16/619,730 to NAKANO et al., which was filed on Dec. 5, 2019.
U.S. Appl. No. 16/621,030 to MIZUNO et al., which was filed on Dec. 10, 2019.
U.S. Appl. No. 16/344,620 to MIZUNO et al., which was filed on Apr. 24, 2019.
Indian Office Action, Indian Patent Office, Application No. 201917044820, issued Jul. 1, 2020.
Chinese Office Action with search report, Chinese Patent Office, Application No. 201880030368.9, issued Jun. 2, 2020, with English translation of search report.

* cited by examiner

WIRE HARNESS FIXING STRUCTURE AND WIRE HARNESS

CROSS-REFERENCE TO RELATED APPLICATIONS

This application is a continuation of U.S. patent application Ser. No. 16/607,496, filed on Oct. 23, 2019, which is a U.S. National Stage Application of International Patent Application No. PCT/JP2018/017147, filed on Apr. 27, 2018, and which claims priority to Japanese Patent Application No. 2017-094006, filed on May 10, 2017. The entire disclosures of each of the above-identified applications, including the specification, drawings, and claims of each of these applications, are incorporated by reference herein in their entirety.

TECHNICAL FIELD

The present application relates to a technique of fixing a wire harness to a mounting object.

BACKGROUND ART

A technique of fixing a wire harness to a mounting object is described in Patent Documents 1 and 2, for example. Patent Document 1 discloses a technique of fixing a wire harness to a mounting object using a clamp (also referred to as a clip, for example). Patent Document 2 discloses a technique of fixing a roof harness to a roof lining (also referred to as a head lining or a roof trim, for example).

Herein, when the wire harness is fixed using the clamp as is the case for Patent Document 1, a hole for fixing the clamp needs to be formed in the mounting object. However, when the mounting object of the wire harness is a member exposed indoors such as the roof lining described in Patent Document 2, there is a possibility that the clamp may be exposed indoors in a case where a hole for fixing the clamp is formed in the member and the clamp is inserted into and locked to the hole. As described above, it may not be appropriate in some cases, depending on the mounting object, to apply the technique of forming the hole for fixing the clamp and fixing the clamp.

Thus, in Patent Document 2, the roof harness is fixed to the roof lining by an adhesive agent such as a pressure sensitive adhesive tape or a hot-melt material.

Background Art Documents

Patent Documents

Patent Document 1: Japanese Patent Application Laid-Open No. 2012-10474

Patent Document 2: Japanese Patent Application Laid-Open No. 2000-335329

SUMMARY

Problem to be Solved

However, there is a possibility that the number of manufacturing processes in assembling a vehicle increases in a fixing method using the adhesive agent such as the pressure sensitive adhesive tape or the hot-melt material.

An object of the present application is to provide a technique capable of simply fixing a wire harness in assembling a vehicle even to a mounting object which is not suitable for having a clamp hole to fix a clamp.

Means to Solve the Problem

In order to solve the above problem, a wire harness fixing structure according to a first aspect includes: a plate-like member including a first layer and a second layer and interiorly mounted on a vehicle, the second layer stacked on a first main surface of the first layer and softer than the first layer; and a wire harness including an electrical wire disposed along the plate-like member and a fixing member attached to the electrical wire to fix the electrical wire to the plate-like member, wherein the fixing member includes: a through locking piece in which a tip portion is formed into a shape of being able to pass through a portion in the first layer where a hole is not formed from a second main surface at an opposite side of the first layer from the first main surface and is locked to the first main surface while passing through the first layer; a regulation piece provided with a space between the regulation piece and the through locking piece to stop the through locking piece from passing through a surface of the plate-like member; and a column connecting the through locking piece and the regulation piece.

The wire harness fixing structure according to a second aspect is the wire harness fixing structure according to the first aspect, wherein the plate-like member further includes a third layer stacked on an opposite side of the second layer from the first layer and formed harder than the second layer.

The wire harness fixing structure according to a third aspect is the wire harness fixing structure according to the first or second aspect, wherein the electrical wire is disposed in a flat state.

The wire harness fixing structure according to a fourth aspect is the wire harness fixing structure according to the third aspect, wherein the wire harness further includes an electrical wire fixing sheet part which is formed into a sheet and the electrical wire is fixed to by sewing or welding.

The wire harness fixing structure according to a fifth aspect is the wire harness fixing structure according to any one of the first to fourth aspects, wherein the wire harness further includes a fixing member attaching sheet part which is formed into a sheet, the fixing member is attached to, and intervenes between the regulation piece and the first layer.

The wire harness fixing structure according to a sixth aspect is the wire harness fixing structure according to any one of the first to fifth aspects, wherein the fixing member includes: a first member including the through locking piece and the column, a hole formed in the column; and a second member including an insertion part which is inserted into the hole to maintain a state where the through locking piece is locked to the plate-like member.

The wire harness fixing structure according to a seventh aspect is the wire harness fixing structure according to any one of the first to sixth aspects, wherein the plate-like member and the fixing member have characteristics that the through locking piece of the fixing member can pass through a portion in the plate-like member where a hole is not formed and be locked to the portion.

A wire harness according to an eighth aspect includes: an electrical wire disposed along a plate-like member which includes a first layer and a second layer and is interiorly mounted on a vehicle, the second layer stacked on a first main surface of the first layer and softer than the first layer; and a fixing member attached to the electrical wire to fix the electrical wire to the plate-like member, wherein the fixing member includes: a through locking piece in which a tip portion is formed into a shape of being able to pass through a portion in the first layer where a hole is not formed from a second main surface at an opposite side of the first layer from the first main surface and can be locked to a side of the first main surface while passing through the first layer; a regulation piece provided with a space between the regulation piece and the through locking piece to stop the through locking piece from passing through a surface of the plate-like member; and a column connecting the through locking piece and the regulation piece.

Effects

According to the first to eighth aspects, the fixing member can directly pass through the first layer in the plate-like member and be locked thereto as it is. At this time, the second layer is softer than the first layer, thus the through locking piece hardly passes through the second layer. Thus, the exposure of the through locking piece can be suppressed. According to the above configuration, the wire harness can be simply fixed, in assembling the vehicle, even to a mounting object which is not suitable for having a clamp hole to fix a clamp.

When the through locking piece does not pass through the second layer, it is considered that a portion in the second layer pressed by the through locking piece is raised. Also in this case, according to the second aspect, the third layer is harder than the second layer, thus the rise in the third layer is suppressed. Accordingly, when the third layer is located on the indoor side, the rise caused by the through locking piece is hardly specified from the indoor side. Even when the through locking piece passes through the second layer, the exposure of the through locking piece can be suppressed by the third layer. In this case, it is considered, for example, that the third layer is harder than the through locking piece, thus the passing of the through locking piece which has reached the third layer is directly suppressed. It is considered, for example, that the thickness of the third layer is larger than the length dimension of the tip portion of the through locking piece exposed from the second layer, thus suppressed is that the through locking piece passes through the third layer.

It is considered, for example, when the fixing members are formed into different shapes with the same material, there is nearly a conflicting relationship between a passing performance (the degree of passing through the first layer) and a locking performance (the degree of difficulty in getting out when the fixing member is locked after passing through the first layer) of the through locking piece. Also in this case, according to the third aspect, the electrical wires are disposed in the flat state, thus when the electrical wires vibrate due to a vibration of the vehicle, amplitude of vibration can be made small. Thus, even when the locking performance of the through locking piece is low, the fixing member hardly gets out of the plate-like member. Accordingly, both the necessary passing performance and locking performance can be easily achieved.

Particularly, according to the fourth aspect, the electrical wires can be disposed in the flat state. It is also possible to press and attach the fixing member to the electrical wire fixing sheet part.

Particularly, according to the fifth aspect, when the same type of fixing members are used in a plural types of plate-like members each including the first layer with the different thickness, the difference in thickness can be absorbed by the fixing member attaching sheet part.

Particularly, according to the sixth aspect, the insertion part is inserted into the hole, thus easily maintained is a state where the through locking piece is locked to the plate-like member. The through locking piece can be made small in a state where the insertion part is located before a position in the hole where the locking state of the through locking piece can be maintained. Accordingly, the through locking piece can easily pass through the plate-like member.

DESCRIPTION OF EMBODIMENT(S)

Embodiment

Figure 1:
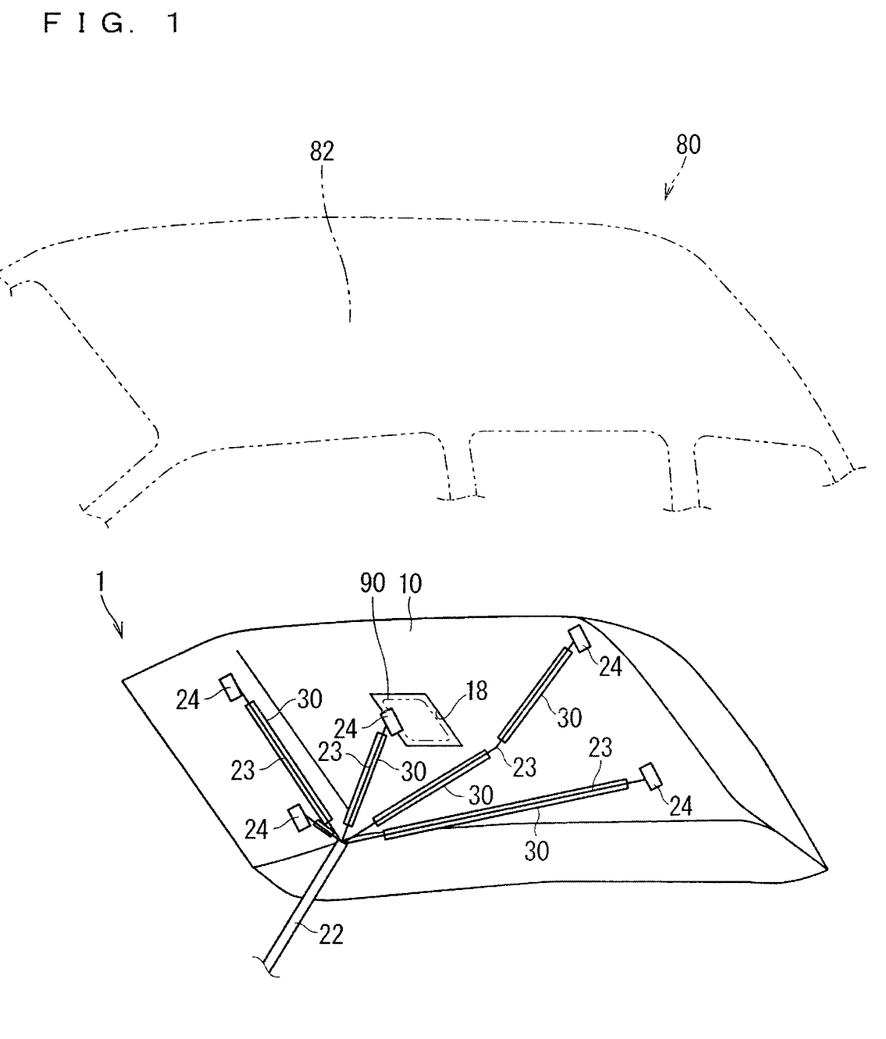
FIG. 1 A schematic exploded perspective view illustrating a wire harness fixing structure according to an embodiment and an assembling object thereof.
Figure 2:
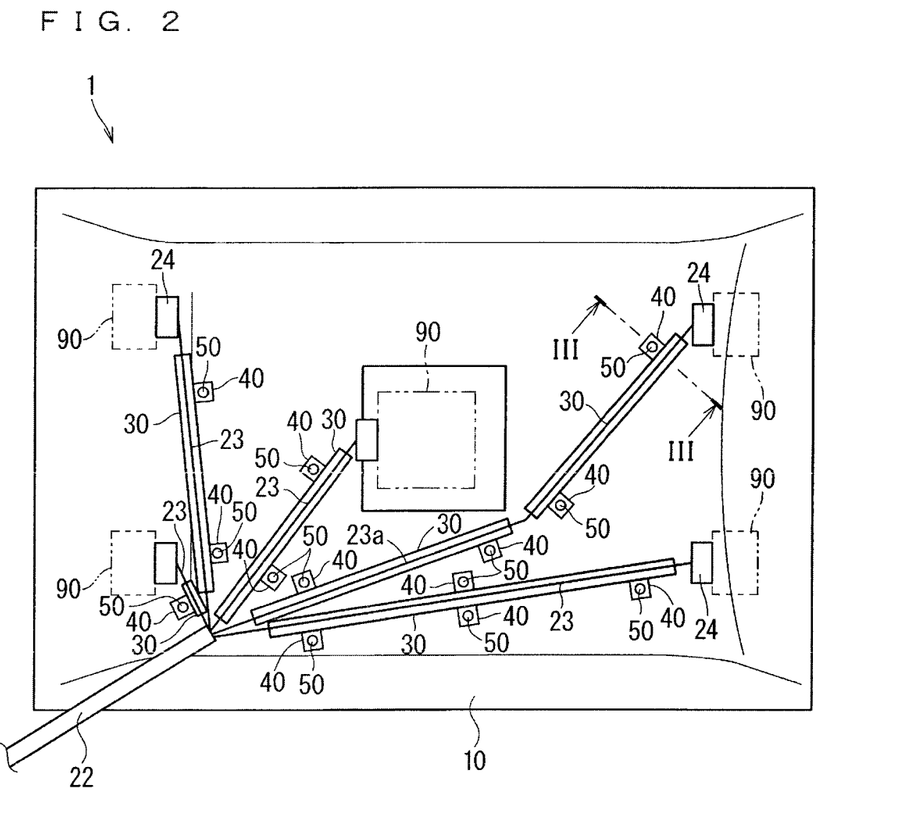
FIG. 2 A schematic plan view illustrating the wire harness fixing structure according to the embodiment.
Figure 3:
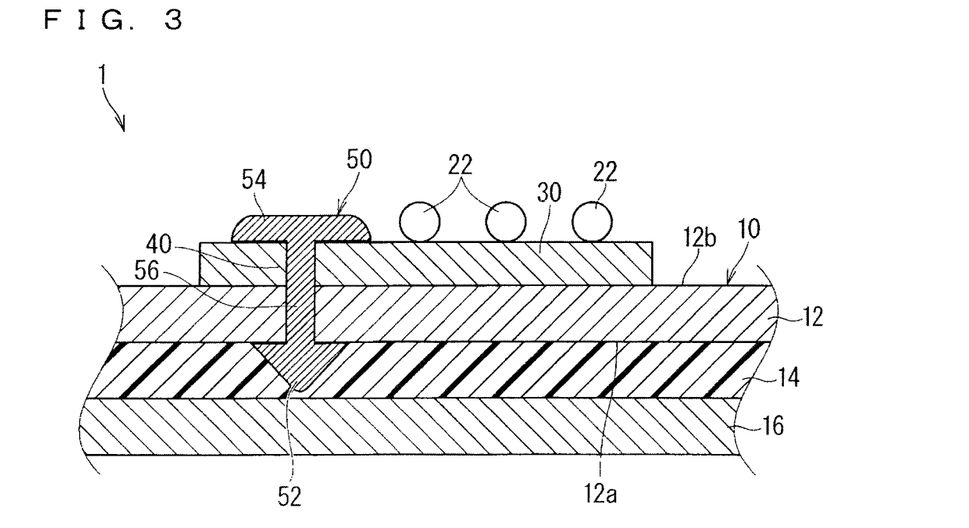
FIG. 3 A cross-sectional view of the wire harness fixing structure cut along a III-III line in FIG. 2.

A wire harness fixing structure according to an embodiment is described hereinafter. FIG. 1 is a schematic exploded perspective view illustrating a wire harness fixing structure 1 according to the embodiment and a vehicle body 80 to which the wire harness fixing structure 1 is to be assembled. FIG. 2 is a schematic plan view illustrating the wire harness fixing structure 1 according to the embodiment. FIG. 3 is a cross-sectional view of the wire harness fixing structure 1 cut along a line in FIG. 2.

The wire harness fixing structure 1 according to the embodiment includes a plate-like member 10 and a wire harness 20 fixed to the plate-like member 10.

The plate-like member 10 is a member interiorly mounted on a vehicle. Specifically, the plate-like member 10 includes a first layer 12 and a second layer 14. Herein, the plate-like member 10 further includes a third layer 16.

The second layer 14 is formed softer than the first layer 12. The third layer 16 is formed harder than the second layer 14. In comparing the first layer 12 and the third layer 16, the first layer 12 or the third layer 16 may be harder or they may have the same hardness.

The second layer 14 is stacked on a first main surface 12a of the first layer 12. The third layer 16 is stacked on an opposite side of the second layer 14 from the first layer 12. Accordingly, the first layer 12, the second layer 14, and the third layer 16 are stacked in this order. In the description hereinafter, the plate-like member 10 is interiorly mounted so that a surface of the plate-like member 10 on a side where the second layer 14 is located with respect to the first layer 12 faces an indoor side, but may be interiorly mounted so that a surface of the plate-like member 10 on a side where the first layer 12 is located with respect to the second layer 14 faces the indoor side.

More specifically, the plate-like member 10 is described as a roof lining herein. Accordingly, the plate-like member 10 is attached to an inner surface of a ceiling part 82 in the vehicle body 80. However, it is also considered that the plate-like member 10 is a member interiorly mounted on the other part, such as a door trim, in a vehicle. At this time, the wire harness fixing structure 1 is preferable in a case where one surface of the plate-like member 10 is exposed indoors.

Known as such a roof lining is a roof lining including a foam resin layer for purpose of sound absorption or thermal insulation and a reinforcement layer provided on both surfaces of the foam resin layer to reinforce the foam resin layer. In the description hereinafter, in the plate-like member 10, the second layer 14 is the foam resin layer described above, and each of the first layer 12 and the third layer 16 is the reinforcement layer described above. Applicable to a resin which is a material of the foam resin layer are, for example, polyurethane series resin, polypropylene series resin, and modified polyphenylene ether series resin, for example. Considered as a configuration of the reinforcement layer is that a plate material provided separately from the foam resin layer is joined to a plate material constituting the foam resin layer. Considered in this case as the plate material constituting the reinforcement layer is, for example, a resin plate material, a plate material made of glass fiber, carbon fiber, basalt fiber, natural fiber, and organic fiber, or a non-woven cloth. A so-called skin layer is also considered as the reinforcement layer. The skin layer is a hard layer formed, at a time of forming the foam resin layer, of the same resin on the surface of the foam resin layer. Types of the first layer 12 and the third layer 16 may be the same or different from each other.

When the plate-like member 10 is the roof lining, considered is that a surface skin layer not shown in the drawings is stacked on an opposite side of the third layer 16 from the second layer 14. The surface skin layer is formed of a material such as a non-woven cloth, a woven cloth, or a knitted cloth, for example. A main surface of the surface skin layer at an opposite side of the surface skin layer from the third layer 16 is defined as an indoor side surface of the plate-like member 10, and is exposed indoors. Also considered is that a film, for example, is stacked as a rear surface layer on an opposite side of the first layer 12 from the second layer 14. The first main surface 12a in the first layer 12 or a main surface of the rear surface layer, in the case where the rear surface layer is stacked, at an opposite side of the rear surface layer from the first layer 12 is defined as a vehicle body 80 side surface in the plate-like member 10. The indoor side surface in the plate-like member 10 is simply referred to as the front surface and the vehicle body 80 side surface in the plate-like member 10 is referred to as the rear surface in some cases hereinafter.

A thickness of each layer in the plate-like member 10 is appropriately set based on a specification required for the plate-like member 10. There may be a case herein that the plate-like member 10 partially includes a portion having a different thickness. Considered, for example, is that the plate-like member 10 formed into a flat plate-like shape once is heated and cold-pressed, thereby being partially bent and deformed, and is molded into a desired shape. In this case, there may be a case where a thickness of a portion bent and deformed by heating and cold-pressing is smaller than that of a portion not bent and deformed.

An opening 18 is formed in the plate-like member 10. The opening 18 is a part where an electrical component such as an illumination lamp is disposed, for example. Accordingly, the wire harness 20 is disposed on the plate-like member 10 to avoid the opening 18.

Figure 4:
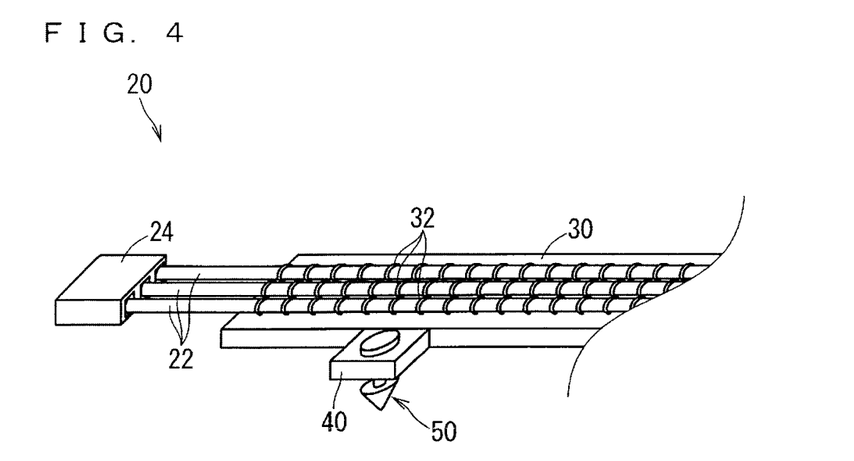
FIG. 4 A schematic perspective view illustrating a wire harness according to the embodiment.

FIG. 4 is a schematic perspective view illustrating the wire harness 20 according to the embodiment.

The wire harness 20 includes electrical wires 22 and a fixing member 50. Herein, the wire harness 20 further includes an electrical wire fixing sheet part 30. Herein, the wire harness 20 further includes a fixing member attaching sheet part 40.

The electrical wires 22 are disposed along the plate-like member 10. More specifically, the electric wires 22 are disposed to have an overlap with the plate-like member 10 in at least a part of a region along a longitudinal direction. It is considered that insulated electrical wires each including a core wire and an insulating covering for covering the core wire, for example, are used as the electrical wires 22. The core wire is made of a conductive material such as copper or aluminum. The core wire may be a single wire or a twisted wire. The insulating covering may be formed by extrusion molding, for example, a resin such as polyvinyl chloride (PVC), polyethylene (PE), polypropylene (PP) around the core wire or by applying, for example, varnish (also referred to as an enamel coating) around the core wire and baking the varnish.

The number of the electrical wires 22 may be at least one. Herein, the plurality of electrical wires 22 are included. The plurality of electrical wires 22 are disposed in a flat state on the plate-like member 10. In the example described in the present embodiment, the plurality of electrical wires 22 extend from the outside of the plate-like member 10 toward the plate-like member 10 in a bundled form. At this time, the plurality of electrical wires 22 are halfway branched, and each of the branched electrical wires 22 extends toward a plurality of parts in the plate-like member 10. At this time, each branch-line part 23 is branched in a position close to a rim of the plate-like member 10, and extends through a path as short as possible to a position of a destination member 90, which is the other party of connection, while avoiding portions inappropriate for the arrangement of the electrical wires 22 such as the opening 18. In the example illustrated in FIG. 2, all terminal parts of the branch-line parts 23 are connected to the destination members 90 on the plate-like member 10, however, some of the terminal parts may pass through the plate-like member and extend to a rear side of the vehicle. The destination member 90 is considered an illumination member, a sensor, and an antenna, for example.

Each branch-line part 23 is connected to the destination member 90 mounted on the vehicle via a connector 24 provided on an end of the branch-line part 23.

The electrical wire fixing sheet part 30 is formed into a sheet. The electrical wires 22 are fixed to the electrical wire fixing sheet part 30. A path of the electric wires 22 is thereby regulated. A material constituting the electrical wire fixing sheet part 30 is not particularly limited. For example, in the example illustrated in FIG. 4, the electrical wires 22 are sewn to the electrical wire fixing sheet part 30 with a thread 32, thereby being fixed to electrical wire fixing sheet part 30. Applicable is the electrical wire fixing sheet part 30 to which the electrical wires 22 can be sewn.

Applicable as a method of sewing the electrical wires 22 is a sewing using a sewing machine or a sewing by hand obviously. When the electrical wires 22 are sewn using the sewing machine, considered is a case where a needle thread and a bobbin thread in the sewing machine are prepared separately from the electrical wires 22 or a case where the electrical wires 22 are used as one of the needle thread and the bobbin thread in the sewing machine.

Figure 5:
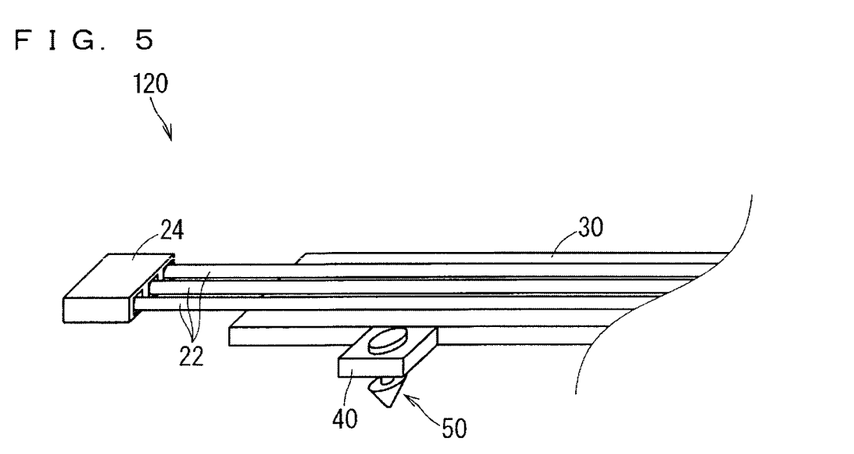
FIG. 5 A schematic perspective view illustrating a modification example of the wire harness.

However, the method of fixing the electrical wires 22 to the electrical wire fixing sheet part 30 is not limited to the sewing. For example, the electrical wires 22 may be fixed to the electrical wire fixing sheet part 30 by welding as is a case for a wire harness 120 illustrated in FIG. 5. Applicable in this case is the electrical wire fixing sheet part 30 enabling the welding of the electrical wires 22. Applicable as the welding method is ultrasonic welding, laser welding, or thermal welding, for example. The electrical wires 22 may be fixed to the electrical wire fixing sheet part 30 by an adhesive agent or a pressure sensitive adhesive tape, for example. It is also applicable that the electrical wire fixing sheet part includes a two-layered sheet material and the electrical wires 22 are sandwiched and fixed by the two-layered sheet material.

Herein, the sheet material constituting the electrical wire fixing sheet part 30 is separately provided for each branch-line part 23, however, there may also be a case where the plurality of branch-line parts 23 are fixed to one sheet material.

In the example illustrated in FIG. 2, the electrical wires 22 are disposed in a straight line form on the electrical wire fixing sheet part 30, however, there may be a portion halfway bent and disposed. For example, the branch-line part 23a is bent and disposed to avoid the opening 18, and the parts on either side of the bent portion are fixed to the different sheet materials, however, the bent portion and the either side thereof may be fixed to the same one sheet material. When an extension direction of the electrical wires 22 along the shortest path from the branch position and a fitting direction of the connector 24 provided on the end of the electrical wires 22 and a receiving connector provided on the destination member 90 are different from each other, it is considered that part of the electrical wires 22 around part extending from the connector 24 located on the end of the electrical wires 22 is bent. In this case, also considered is that the bent portion is fixed to the electrical wire fixing sheet part 30.

The electrical wire fixing sheet part 30 includes one sheet material covering the electrical wires 22 from one side. The electrical wires 22 are disposed on one main surface of the electrical wire fixing sheet part 30 and fixed thereto. The wire harness 20 is disposed on the plate-like member 10 so that the sheet material is located on the side of the plate-like member 10. However, the wire harness 20 is disposed on the plate-like member 10 so that the electrical wires 22 are located on the side of the plate-like member 10. There may be a case where the electrical wires 22 halfway transfer from one main surface side to the other main surface side of the electrical wire fixing sheet part 30.

Figure 6:
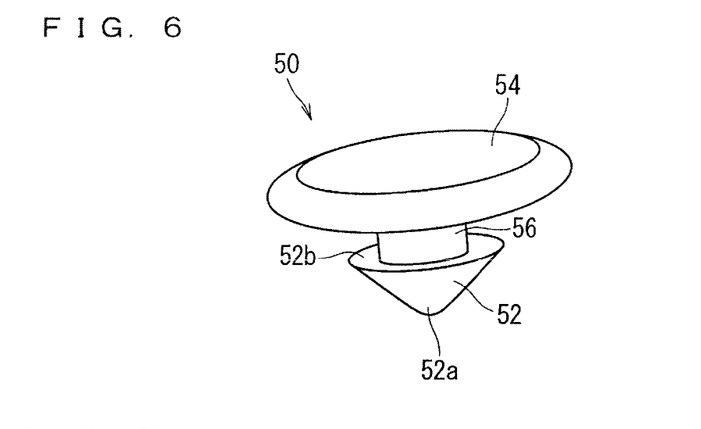
FIG. 6 A schematic perspective view illustrating a fixing member according to the embodiment.

FIG. 6 is a schematic perspective view illustrating the fixing member 50 according to the embodiment.

The fixing member 50 is attached to the electrical wires 22. The fixing member 50 is a member for fixing the electrical wires 22 to the plate-like member 10. Specifically, the fixing member 50 includes a through locking piece 52, a regulation piece 54, and a column 56. The fixing member 50 is formed of a resin or metal, for example, as a material. The fixing member 50 is considered an integrated molded component using molds, for example.

In the through locking piece 52, a tip portion 52a is formed to be able to pass through the first layer 12 from a second main surface 12b at an opposite side of the first layer 12 from the first main surface 12a. That is to say, the through locking piece 52 is formed to be able to pass through the plate-like member 10 from the rear surface of the plate-like member 10. The through locking piece 52 can pass through a portion in the plate-like member 10 where a hole is not formed. The through locking piece 52 is locked to the first main surface 12a while passing through the first layer 12. The through locking piece 52 is formed into a tapered shape, for example, (a cone shape herein). The through locking piece 52 is formed into the tapered shape, thus mold release can be easily performed when the fixing member 50 is integrally molded using molds. A bottom part 52b of a cone is a part connected to the column 56, and is a part locked to the first main surface 12a while passing through the first layer 12. A vertex of the cone is the tip portion 52a in the through locking piece 52.

The regulation piece 54 is provided with a space between the regulation piece 54 and the through locking piece 52. The regulation piece 54 stops the through locking piece 52 from passing through the surface of the plate-like member 10. For example, the regulation piece 54 is hooked to and locked to the second main surface 12b of the first layer 12 or the rear surface of the plate-like member 10, thereby stopping the through locking piece 52 from proceeding forward in a passing-through direction any more. Accordingly, any shape and size of the regulation piece 54 are applicable as long as the through locking piece 52 can be hooked to a peripheral edge of a hole formed in the first layer 12 and a layer closer to the rear surface than the first layer 12 when the through locking piece 52 passes through the first layer 12 and the layer closer to the rear surface. Herein, the regulation piece 54 is formed into the disk shape having the same shaft center as the through locking piece 52. In this case, the regulation piece 54 is preferably formed equal to or larger than the through locking piece 52. As illustrated in FIG. 6, an outer periphery of the main surface at an opposite side of the regulation piece 54 from a surface connected to the column 56 (referred to as the bottom surface of the regulation piece 54 in some cases hereinafter) preferably has a chamfered shape as rounded shape.

The column 56 connects the through locking piece 52 and the regulation piece 54. Herein, the column 56 is formed into a column shape (a cylindrical shape herein) thinner than the bottom part 52b of the through locking piece 52 and thinner than the regulation piece 54. A shaft center of the column 56 coincides with the shaft center of the through locking piece 52 and the shaft center or the regulation piece 54. At least part of the column 56 is located in the first layer 12 in a state where the fixing member 50 is inserted into the plate-like member 10. At least part of the column 56 is located in the fixing member attaching sheet part 40 in a state where the fixing member 50 is attached to the fixing member attaching sheet part 40.

Figure 7:
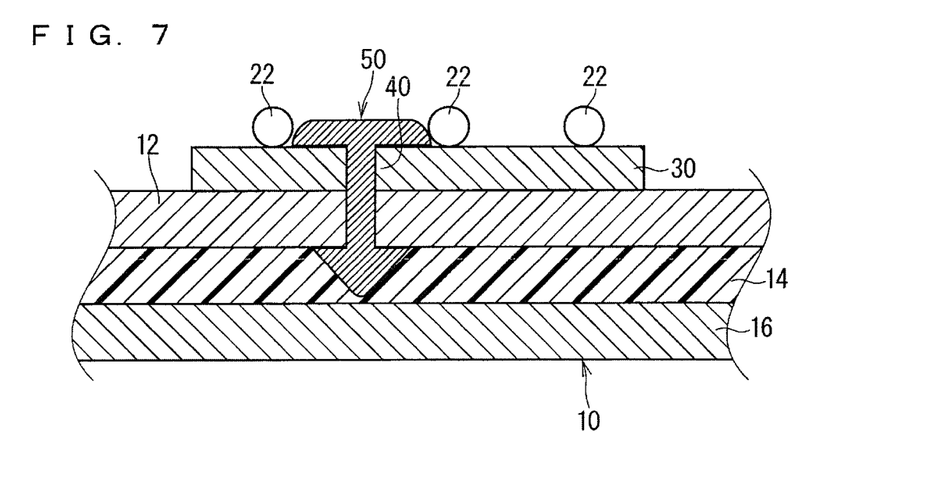
FIG. 7 A schematic cross-sectional view illustrating a first modification example of the wire harness fixing structure.
Figure 8:
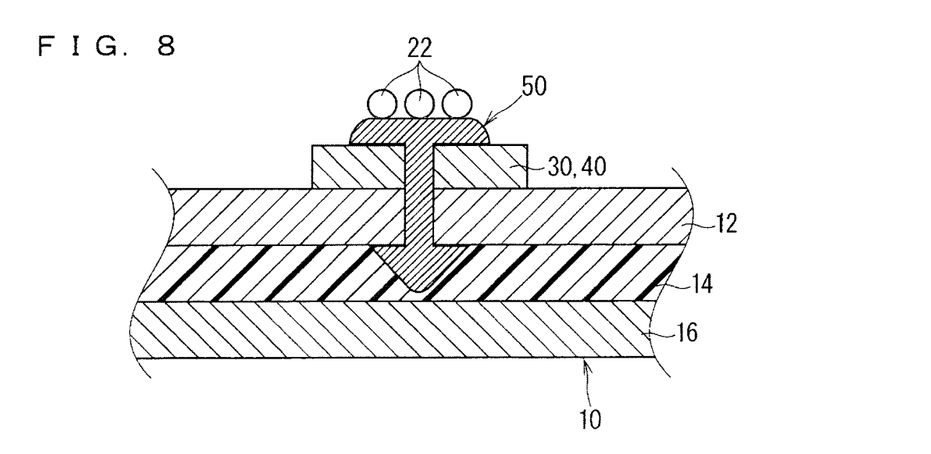
FIG. 8 A schematic cross-sectional view illustrating a second modification example of the wire harness fixing structure.

The fixing member attaching sheet part 40 is formed into a sheet. The fixing member attaching sheet part 40 is a part to which the fixing member 50 is attached. The fixing member attaching sheet part 40 intervenes between the regulation piece 54 and the first layer 12. For example, the fixing member attaching sheet part 40 is considered the same sheet material as the electrical wire fixing sheet part 30. In this case, in one sheet material, a part which is not used for fixing the electrical wires 22, for example, a part to which the thread 32 is not sewn or a part which is not welded to the covering of the electrical wires 22 can be used as the fixing member attaching sheet part 40. In the example illustrated in FIG. 2, the fixing member attaching sheet part 40 is provided on a lateral side of the electrical wires 22, that is to say, a position where the fixing member 50 is attached is a position lateral to the electrical wires 22, however, this configuration is not necessary. For example, as illustrated in FIG. 7, the fixing member 50 may be attached between the plurality of electrical wires 22 which are parallelly arranged. For example, as illustrated in FIG. 8, the fixing member 50 may be attached below the electrical wires 22. In this case, it is considered, for example, that the fixing member 50 is attached to a part of one sheet material, which has an overlap with the electrical wires 22 but the electrical wires 22 are not fixed to, in a state where a part of a region in the electrical wires 22 along the longitudinal direction is not fixed to the one sheet material.

Figure 9:
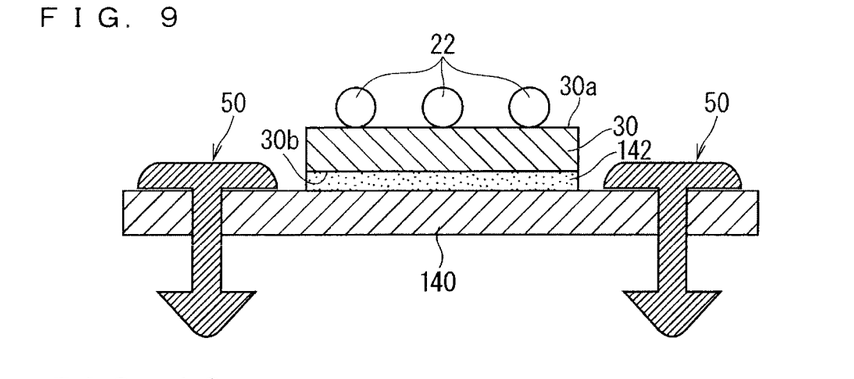
FIG. 9 A schematic cross-sectional view illustrating a third modification example of the wire harness fixing structure.

For example, as illustrated in FIG. 9, a fixing member attaching sheet part 140 may be provided separately from the electrical wire fixing sheet part 30 and joined to the electrical wire fixing sheet part 30. Considered as a joining method are welding or a pressure sensitive adhesive double sided tape, for example, as well as an adhesive agent 142. In the example illustrated in FIG. 9, the fixing member attaching sheet part 140 is joined to a main surface 30b of the electrical wire fixing sheet part 30 at an opposite side of the electrical wire fixing sheet part 30 from a main surface 30a where the electrical wires 22 are disposed, but may be joined to the main surface 30a where the electrical wires 22 are disposed In this case, the electrical wires 22 may be sandwiched between the fixing member attaching sheet part 140 and the electrical wire fixing sheet part 30.

In the same manner, as illustrated in FIG. 9, the fixing members 50 may be provided on both lateral sides of the electrical wires 22. Needless to say, the fixing members 50 may be provided on both lateral sides of the electrical wires 22 also in a case where the fixing member attaching sheet part 40 and the electrical wire fixing sheet part 30 are made up of one sheet material as illustrated in FIG. 2.

When the fixing member 50 is attached to the fixing member attaching sheet part 40, a hole through which the fixing member 50 is inserted may be or may not be previously provided in the sheet material constituting the fixing member attaching sheet part 40. When the hole through which the fixing member 50 is inserted is previously provided, the hole may pass the through locking piece 52 or the regulation piece 54. When the hole is passed through by the through locking piece 52, it is considered that the hole is formed into a circular shape smaller than the bottom part 52b of the through locking piece 52, for example. For example, when the hole is passed through by the regulation piece 54, it is considered that the hole is formed into a slit-like shape having substantially the same length dimension as a diameter of the regulation piece 54. When the hole through which the fixing member 50 is inserted is not previously provided, it is considered that the through locking piece 52 is stuck into and passes through the fixing member attaching sheet part 40.

Figure 10:
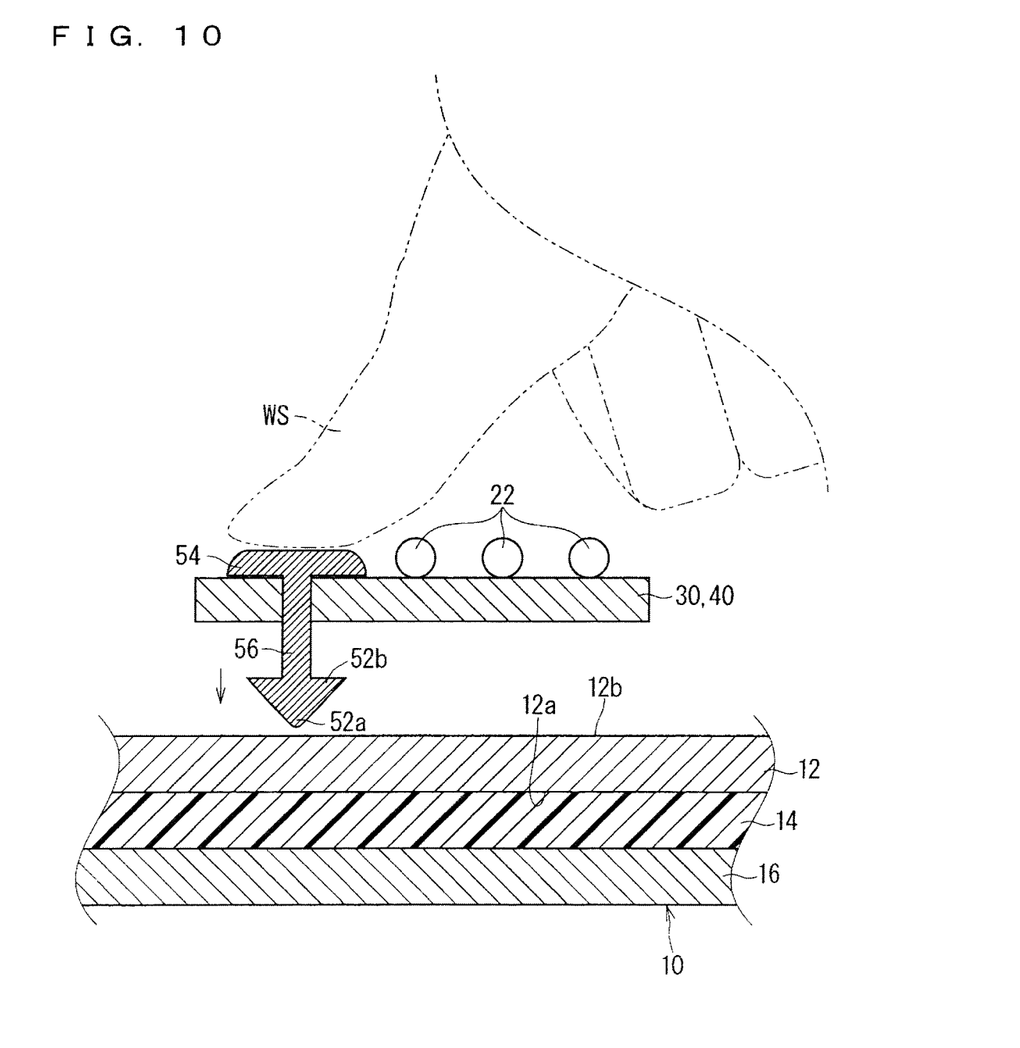
FIG. 10 An explanation diagram illustrating the wire harness fixed to a plate-like member.

Described herein is an operation of fixing the wire harness 20 to the plate-like member 10 using the fixing member 50. FIG. 10 is an explanation diagram illustrating the wire harness 20 fixed to the plate-like member 10.

Firstly, prepared as illustrated in FIG. 3 is the wire harness 20 in which the fixing member 50 is fixed to the electrical wires 22. Then, the wire harness 20 is disposed in a form corresponding to an arrangement form on the plate-like member 10.

Subsequently, as illustrated in FIG. 10, the tip portion 52a of the through locking piece 52 in the fixing member 50 is directed to the rear surface of the plate-like member 10. At this time, a part of the plate-like member 10 located in front of the through locking piece 52 is a part where the hole is not previously formed. In this state, the bottom surface of the regulation piece 54 is pressed to insert the through locking piece 52 into the plate-like member 10 from the rear surface.

Then, when the regulation piece 54 is hooked to the rear surface of the plate-like member 10 via the fixing member attaching sheet part 40, the further pressing is stopped. Accordingly, as illustrated in FIG. 3, the through locking piece 52 passes through the first layer 12, and the bottom part 52b of the through locking piece 52 is locked to the first main surface 12a of the first layer 12. The bottom part 52b of the through locking piece 52 may be locked to the first main surface 12a of the first layer 12 while involving a part of the second layer 14.

Herein, when the bottom part 52b of the through locking piece 52 is locked to the first main surface 12a of the first layer 12, it is considered that the through locking piece 52 can be hooked by an occurrence of at least one of a first hooking state and a second hooking state described below, for example.

Firstly, the first hooking state is as follows. That is to say, when the through locking piece 52 is inserted into the first layer 12, the through locking piece 52 is elastically deformed in a manner that a diameter of the bottom part 52b decreases under reaction force from the first layer 12. When the through locking piece 52 passes through the first layer 12 in this state, the state where the through locking piece 52 is elastically deformed is reduced by reason that the second layer 14 is softer than the first layer 12. Thus, the bottom part 52b of the through locking piece 52 extends outside the hole formed in the first layer 12 in accordance with the passing of the through locking piece 52, thus can be hooked to the peripheral edge of the hole.

The second hooking state is as follows. That is to say, when the through locking piece 52 is inserted into the first layer 12, the first layer 12 is elastically deformed to be radially spread with respect to the through locking piece 52 under force from the through locking piece 52. The hole formed in the first layer 12 in accordance with the passing of the through locking piece 52 in this state gets smaller than the bottom part 52b of the through locking piece 52 in accordance with the reduction in the elastic deformation of the first layer 12 after the passing of the through locking piece 52. Thus, the bottom part 52b of the through locking piece 52 can be hooked to the peripheral edge of the hole.

At this time, it is preferable that the through locking piece 52 can pass through the first layer 12 to such a degree that a worker can make the through locking piece 52 pass through the first layer 12 by pressing the bottom surface of the regulation piece 54 with a finger WS as illustrated in FIG. 10. The degree of passing of the through locking piece 52 through the first layer 12 is considered to be changed in accordance with a shape of the through locking piece 52, particularly a sharpness of the tip portion 52a of the through locking piece 52 and properties (hardness and elasticity) of materials constituting the through locking piece 52 and the first layer 12, for example.

It is preferable that the through locking piece 52 locked to the first main surface 12a of the first layer 12 can hardly get out of the first layer 12 to such a degree that it does not get out during use of the vehicle. The degree of difficulty that the through locking piece 52 locked to the first main surface 12a of the first layer 12 gets out of the first layer 12 is considered to be changed in accordance with a shape of the through locking piece 52, particularly a degree of extension of the bottom part 52b of the through locking piece 52 with respect to the hole formed in the first layer 12 after the through locking piece 52 has passed through the hole and a property (hardness and elasticity) of a material constituting the through locking piece 52 and the first layer 12, for example.

Herein, a sum of a length dimension of the column 56 and a height dimension of the through locking piece 52 is preferably equal to or smaller than a sum of a thickness dimension of the fixing member attaching sheet part 40 and a thickness dimension of the plate-like member 10, and is more preferably equal to or smaller than a sum of the thickness dimension of the fixing member attaching sheet part 40 and a thickness dimension from the second layer 14 to the rear surface in the plate-like member 10. Accordingly, it can be suppressed more reliably that the through locking piece 52 passes through the plate-like member 10 to be exposed out of the front surface. When the sum of the length dimension of the column 56 and the height dimension of the through locking piece 52 is larger than the sum of the thickness dimension of the fixing member attaching sheet part 40 and the thickness dimension of the plate-like member 10, it is considered that the third layer 16 is formed so that the fixing member 50 cannot pass through the third layer 16 for purpose of suppressing the through locking piece 52 passing through the plate-like member 10 and exposed out of the front surface.

The length dimension of the column 56 is preferably equal to or larger than a thickness dimension from the first layer 12 to the rear surface in the plate-like member 10, and is more preferably equal to or larger than a sum of the thickness dimension of the fixing member attaching sheet part 40 and the thickness dimension from the first layer 12 to the rear surface in the plate-like member 10. Accordingly, the through locking piece 52 can pass through the first layer 12, and the bottom part 52b of the through locking piece 52 can be hooked to the first main surface 12a of the first layer 12 more reliably.

There may be a case where one plate-like member 10 includes a portion having a different thickness as described above. Also in this case, the fixing member attaching sheet part 40 intervenes between the regulation piece 54 and the first layer 12, and is compressed in some cases, thus the fixing member attaching sheet part 40 can absorb the difference in the thickness dimension of the plate-like member 10. Accordingly, one fixing member 50 can suffice for the portion having the different thickness in the plate-like member 10.

Subsequently, all the fixing members 50 are pressed into and locked to the plate-like member 10, thus the wire harness 20 can be fixed to the plate-like member 10. When the plurality of branch-line parts 23 are included, it is applicable that one branch-line part 23 is disposed and the fixing member 50 provided on the branch-line part 23 is pressed into the plate-like member 10, and subsequently, the other branch-line part 23 is disposed. It is also applicable that the operation of pressing the fixing member 50 into the plate-like member 10 is performed after all of the branch-line parts 23 are disposed.

According to the above configuration, the fixing member 50 can directly pass through the first layer 12 in the plate-like member 10 and be locked thereto as it is. At this time, the second layer 14 is softer than the first layer 12, thus the through locking piece 52 hardly passes through the second layer 14. Thus, the exposure of the through locking piece 52 can be suppressed. According to the above configuration, the wire harness 20 can be simply fixed, in assembling the vehicle, even to a mounting object which is not suitable for having a clamp hole to fix a clamp. The fixing member 50 can be previously attached to the electrical wires 22, thus the number of manufacturing processes in assembling the vehicle can be reduced also on this point.

When the through locking piece 52 does not pass through the second layer 14, it is considered that a portion in the second layer 14 pressed by the through locking piece 52 is raised. Also in this case, the third layer 16 is harder than the second layer 14, thus the rise in the third layer 16 is suppressed. Accordingly, when the third layer 16 is located on the indoor side, the rise caused by the through locking piece 52 is hardly specified from the indoor side. Even when the through locking piece 52 passes through the second layer 14, the exposure of the through locking piece 52 can be suppressed by the third layer 16. In this case, it is considered, for example, that the third layer 16 is harder than the through locking piece 52, thus the passing of the through locking piece 52 which has reached the third layer 16 is directly suppressed, or the third layer 16 is harder than the first layer 12, thus the through locking piece 52 cannot pass through the third layer 16 with the force to pass through the first layer 12. It is considered, for example, that the thickness of the third layer 16 is larger than the length dimension of the tip portion of the through locking piece 52 exposed from the second layer 14, thus suppressed is that the through locking piece 52 passes through the third layer 16.

It is considered, for example, when the fixing members 50 are formed into different shapes with the same material, there is nearly a conflicting relationship between a passing performance (the degree of passing through the first layer 12) and a locking performance (the degree of difficulty in getting out when the fixing member 50 is locked after passing through the first layer 12) of the through locking piece 52. Also in this case, the electrical wires 22 are disposed in the flat state, thus when the electrical wires 22 vibrate due to a vibration of the vehicle, amplitude of vibration can be made small Thus, even when the locking performance of the through locking piece 52 is low, the fixing member 50 hardly gets out of the plate-like member 10. Accordingly, both the necessary passing performance and locking performance can be easily achieved.

The electrical wire fixing sheet part 30 is provided, thus the electrical wires 22 can be easily disposed in the flat state. It is also possible to press and attach the fixing member 50 in an empty space of the sheet material constituting the electrical wire fixing sheet part 30.

When the same type of fixing members 50 are used in a plural types of plate-like members 10 each including the first layer 12 with the different thickness, the difference in thickness can be absorbed by the fixing member attaching sheet part 40.

Modification Example

Figure 11:
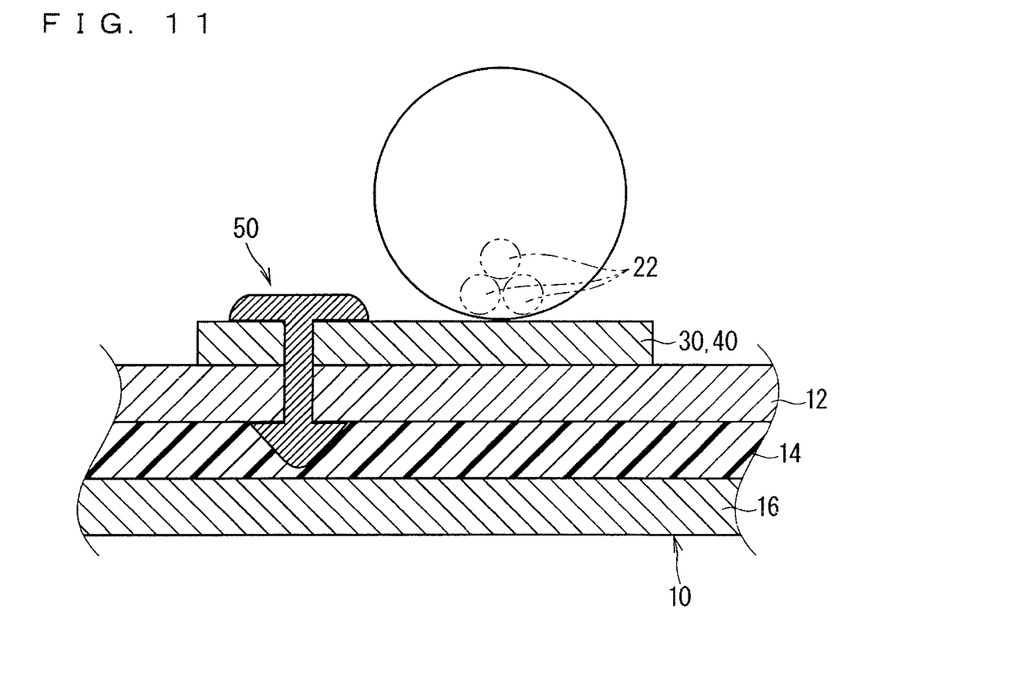
FIG. 11 A schematic cross-sectional view illustrating a modification example of electrical wires.

In the embodiment described above, the plurality of electrical wires 22 are disposed in the flat state on the plate-like member 10, however, this configuration is not necessary. As illustrated in FIG. 11, the electrical wires 22 may be bundled. In the example illustrated in FIG. 11, the electrical wires 22 are bundled to have a circular cross section, but may be bundled to have the other cross-sectional shape.

Figure 12:
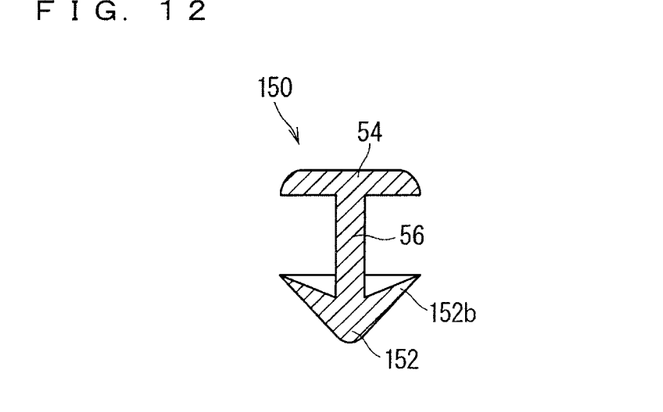
FIG. 12 A schematic cross-sectional view illustrating a first modification example of the fixing member.

In the embodiment described above, the through locking piece 52 in the fixing member 50 has the tapered shape, however, this configuration is not necessary. For example, as is the case for a fixing member 150 illustrated in FIG. 12, a through locking piece 152 may be formed into a shape that an outer edge of a bottom part 152b protrudes toward the side of the regulation piece 54, in other words, a shape that a cone having a height lower than a cone with the bottom part 152b is removed from the side of the bottom part 152b. When the through locking piece 152 is formed into the shape illustrated in FIG. 12, the bottom part 152b can be elastically deformed easily in a direction in which a diameter decreases. The bottom part 152b can also be elastically deformed in a direction in which the diameter increases.

Figure 13:
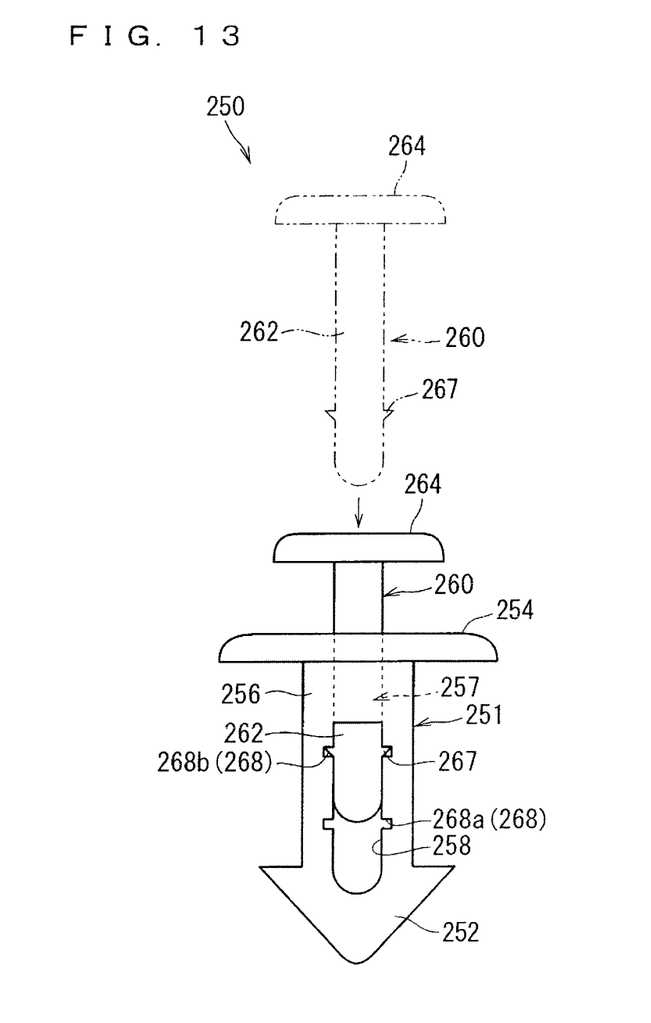
FIG. 13 A schematic front view illustrating a second modification example of the fixing member.

FIG. 13 is a schematic front view illustrating a second modification example of the fixing member 50. A fixing member 250 according to the second modification example is different from the fixing member 50 in that the fixing member 250 can maintain a locking state of the through locking piece. Specifically, the fixing member 250 includes a first member 251 and a second member 260.

The first member 251 includes a through locking piece 252, a regulation piece 254, and a column 256. The through locking piece 252, the regulation piece 254, and the column 256 are formed into shapes similar to through locking piece 52, the regulation piece 54, and the column 56 described above, respectively (the column 256 is slightly thicker than the column 56 herein). In the first member 251, a hole 257 and a through hole 258 are formed in the column 256.

The hole 257 extends from an opening in a bottom surface of the regulation piece 254 toward the through locking piece 252. Herein, the hole 257 has a bottom, and a position of the bottom is set to a position of the through locking piece 252. However, the position of the bottom of the hole 257 may not reach the position of the through locking piece 252. It is also applicable that the hole 257 passes to a tip portion of the through locking piece 252, thus the hole 257 does not have the bottom.

The through hole 258 is formed to reach, from one position in a side surface of the column 256, an opposite position. The hole 257 and the through hole 258 communicate with each other. It is also applicable that the through locking piece 252 is not formed into the cone shape but a shape extending from the column 256 toward both lateral sides. In this case, the through locking piece may be formed in a position sandwiching the through hole 258 formed in the column 256.

Figure 14:
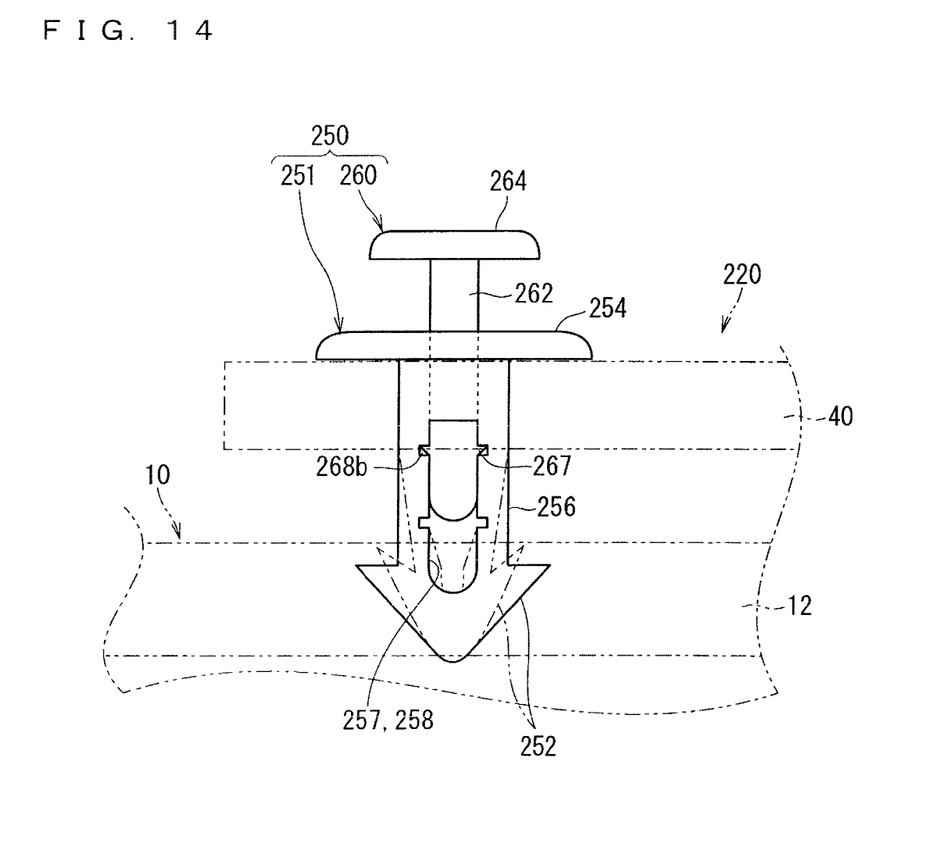
FIG. 14 An explanation diagram illustrating the fixing member according to the second modification example elastically deformed.

The hole 257 is formed in the first member 251, thus as illustrated in FIG. 14, a bottom part of the through locking piece 252 is elastically deformed to be small easily when the through locking piece 252 passes through the plate-like member 10. In the similar manner, the through hole 258 is formed, thus as illustrated in FIG. 14, the bottom part of the through locking piece 252 is elastically deformed to be small easily when the through locking piece 252 passes through the plate-like member 10. The through hole 258 is formed, thus molds can be easily released when the first member 251 is molded using the molds at a time of forming a concave portion 268 described hereinafter in the hole 257.

The second member 260 includes an insertion part 262 insertable into the hole 257 and an insertion regulation piece 264 preventing an excess insertion of the insertion part 262 into the hole 257.

The insertion part 262 is formed into a rod-like shape. The insertion part 262 is inserted into the hole 257, thus it can be suppressed that the through locking piece 252 in the locking state is elastically deformed to be small. Accordingly, the hole 257 and the insertion part 262 function as a maintaining part maintaining the locking state of the through locking piece 252.

It is preferable that the first member 251 and the second member 260 can be locked to each other in a state where an insertion depth of the insertion part 262 inserted into the hole 257 is equal to a first depth. The first depth is a depth that the locking state of the through locking piece 252 locked to the plate-like member 10 can be maintained, and is a depth that the insertion part 262 reaches a back of the hole 257.

Furthermore, it is more preferable that the first member 251 and the second member 260 can be locked to each other in a state where the insertion depth of the insertion part 262 inserted into the hole 257 is equal to a second depth. The second depth is set smaller than the first depth. The second depth is a depth that the insertion part 262 inserted into the hole 257 hardly prevent the elastic deformation of the through locking piece 252 when the first member 251 passes through the plate-like member 10. For example, it is considered that a wire harness 220 has a configuration that the first member 251 in the fixing member 250 is attached to the fixing member attaching sheet part 40 and the second member 260 is locked to the first member 251 in a position of the second depth. In this case, the wire harness 220 is transported to a vehicle assembly plant, and after the through locking piece 252 passes through the plate-like member 10 and is locked thereto, the second member 260 is further inserted into the first member 251. Then, the second member 260 is locked to the first member 251 in a position of the first depth, thereby constituting a wire harness fixing structure 201.

As the configuration that the first member 251 and the second member 260 can be locked in the state where the insertion depth of the insertion part 262 inserted into the hole 257 is the first depth and the second depth, it is considered that a protrusion 267 is formed on one of an inner peripheral surface of the hole 257 and an outer peripheral surface of the insertion part 262 and the concave portion 268 to which the protrusion 267 is locked is formed in the other one of them. Herein, the concave portion 268 is formed in the inner peripheral surface of the hole 257. The protrusion 267 is formed on the outer peripheral surface of the insertion part 262. Herein, two concave portions 268a and 268b are formed with a space therebetween along a depth direction of the hole 257. A state where the protrusion 267 is locked to the concave portion 268a formed in a position close to the back of the hole 257 is a state where the insertion depth of the insertion part 262 inserted into the hole 257 is the first depth. A state where the protrusion 267 is locked to the concave portion 268b formed in a position close to an entrance of the hole 257 is a state where the insertion depth of the insertion part 262 inserted into the hole 257 is the second depth.

At this time, in the protrusion 267 and the concave portion 268, locking force acting backward in the insertion direction of the second member 260 with respect to the first member 251 is larger than locking force acting forward in the insertion direction. That is to say, the protrusion 267 and the concave portion 268 have further effect of preventing the second member 269 from getting out of the first member 251. Herein, the insertion regulation piece 264 makes up for the regulation on the second member 260 moving forward in the insertion direction with respect to the first member 251 at the first depth.

The insertion regulation piece 264 is formed into a flat plate-like shape (circular plate-like shape herein) in the manner similar to the regulation piece 254, for example. The insertion regulation piece 264 is formed smaller than the regulation piece 254 herein, but may be formed equal to or larger than the regulation piece 254. The insertion regulation piece 264 can be hooked into a peripheral edge of the hole 257 in the state where the insertion part 262 is inserted into the hole 257 at the first depth. Accordingly, suppressed is the further insertion of the insertion part 262 into the hole 257.

Herein, the shape of the inner peripheral surface of the hole 257 and the shape of the outer peripheral surface of the insertion part 262 are not particularly limited, thus a circular shape or a rectangular shape may also be applicable. The shape of the inner peripheral surface of the hole 257 and the shape of the outer peripheral surface of the insertion part 262 may be the same or different from each other.

The insertion part 262 may be formed equal to or larger than the hole 257. When the insertion part 262 is formed larger than the hole 257, also applicable is the configuration that the through locking piece 252 is spread by the insertion of the insertion part 262. The insertion part 262 may be formed smaller than the hole 257 as long as the insertion part 262 can maintain the locking state of the through locking piece 252.

Also considered is that the insertion part 262 and the hole 257 are formed so that a relative size thereof differs along a longitudinal direction. It is considered in this case that, for example, the insertion part is formed equal to or smaller than the hole in a corresponding part of the insertion part and the hole between a position where the insertion part is firstly inserted into the hole and the position of the second depth, and the insertion part is formed larger than the hole in a part corresponding to a part between the second depth and the first depth. In this case, the insertion part is equal to or smaller than the hole until the insertion part reaches the position of the second depth, thus insertion force can be reduced. The insertion part is larger than the hole between the position of the second depth and the position of the first depth, thus the insertion force can be increased, and an erroneous insertion of the insertion part before being locked to the plate-like member 10 can be suppressed. A part of the insertion part larger than the hole enables the extension of the through locking piece 252 after the insertion part is locked to the plate-like member 10.

The electrical wires 22 is preferably fixed to the plate-like member 10 using the fixing member 250 described above in the following manner.

That is to say, the first member 251 in the fixing member 250 is attached to the fixing member attaching sheet part 40. Then, the wire harness 220 in which the first member 251 is attached to the fixing member attaching sheet part 40 is transported to a vehicle assembly plant. At this time, the second member 260 is preferably transported in a state of being locked to the first member 251 in the position of the second depth as described above. However, the second member 260 may be transported in a state of not being locked to the first member 251, that is to say, transported separately from the first member 251.

Next, in the vehicle assembly plant, the first member 251 in the wire harness 220 passes through the plate-like member 10 in a state where the wire harness 220 is disposed along the plate-like member 10. At this time, as described above, the hole 257 and the through hole 258 are formed, thus the through locking piece 252 is elastically deformed to be small easily. Thus, the first member 251 can pass through the plate-like member 10 easily.

Figure 15:
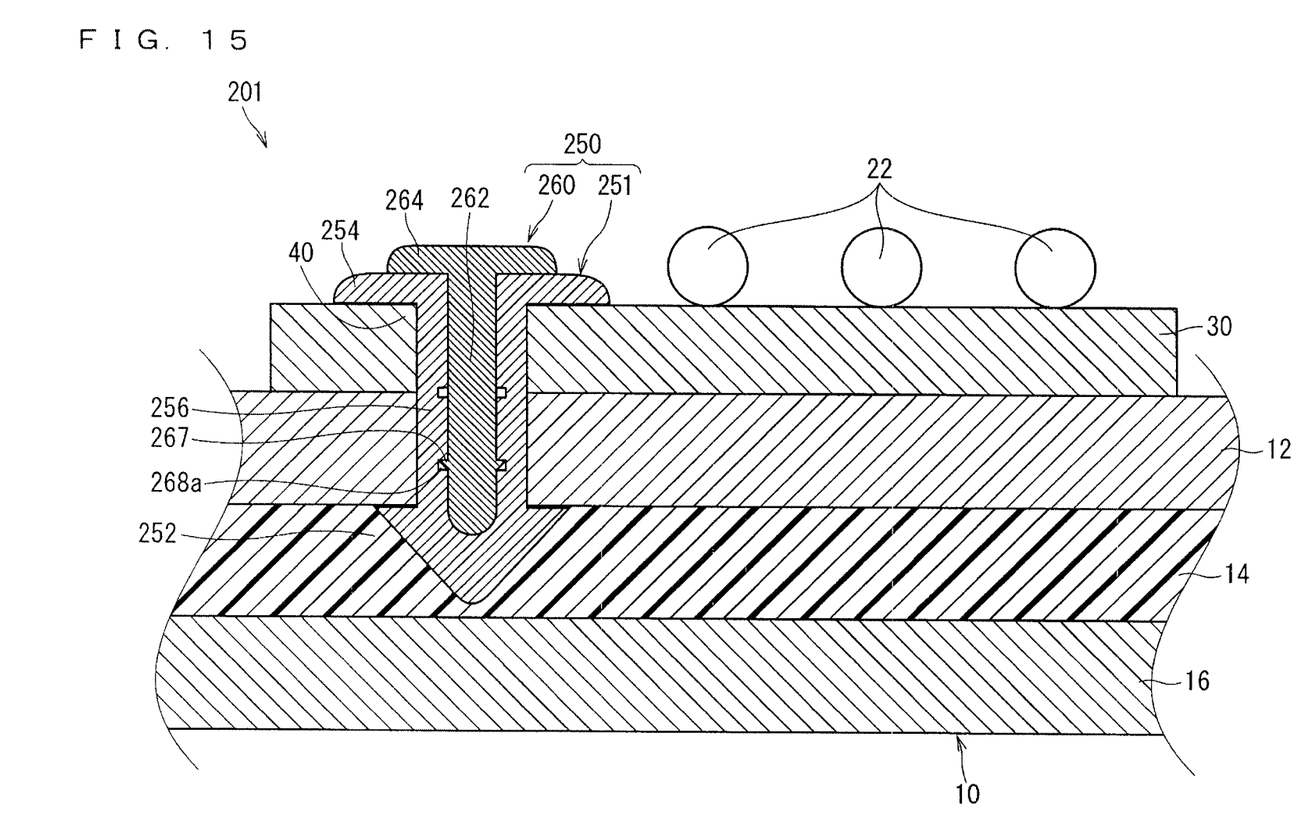
FIG. 15 A schematic cross-sectional view illustrating the wire harness fixing structure including the fixing member according to the second modification example.

After the first member 251 passes through the plate-like member 10, the second member 260 is further inserted into the first member 251 and locked in the position of the first depth. According to the above configuration, as illustrated in FIG. 15, the fixing member 250 passes through the plate-like member 10 and is locked thereto, and furthermore, the locking state is maintained.

The configurations described in the embodiments and modification examples thereof can be appropriately combined as long as they are not contradictory.

Although the present application is described in detail, the foregoing description is in all aspects illustrative and does not restrict the invention. It is therefore understood that numerous modifications and variations can be devised without departing from the scope of the invention.

EXPLANATION OF REFERENCE SIGNS 1 wire harness fixing structure
10 plate-like member
12 first layer
12a first main surface
12b second main surface
14 second layer
16 third layer
18 opening
20 wire harness
22 electrical wire
24 connector
30 electrical wire fixing sheet part
40 fixing member attaching sheet part
50 fixing member
52 through locking piece
52a tip portion
52b bottom part
54 regulation piece
56 column
80 vehicle body
82 ceiling part
90 destination member

The invention claimed is:

1. A wire harness, comprising:
an electrical wire,
a sheet to which the electrical wire is fixed, and
a fixing fastener that is configured to fix the sheet to a plate-like structure, wherein
the fixing fastener includes:
a first part of the fixing fastener that is configured to be disposed on one side of the sheet, and
a second part of the fixing fastener that is configured to pass through the one side of the sheet and to pass through another side of the sheet that opposes the one side, and the second part of the fixing fastener is configured to be embedded in the plate-like structure so that the sheet is sandwiched between the first part of the fixing fastener and the second part of the fixing fastener,
the sheet includes a first sheet and a second sheet provided with a space therebetween along an extension direction of the electrical wire,
the fixing fastener includes a first fixing fastener that is configured to fix the first sheet to the plate-like structure and a second fixing fastener that is configured to fix the second sheet to the plate-like structure, and
a bent portion at which the electrical wire is bent is provided between the first sheet and the second sheet.

2. The wire harness according to claim 1, wherein
all of the electrical wire fixed to the first sheet is fixed to the second sheet, and all of the electrical wire fixed to the second sheet is fixed to the first sheet, and when the first sheet and the second sheet are disposed to spread onto the plate-like structure, the bent portion is disposed to be bent along the plate-like structure.

3. The wire harness according to claim 1, wherein
a plurality of electrical wires including the electrical wire extends to branch into a plurality of branch-line parts, and
the bent portion is provided in a respective one of the branch-line parts.

4. The wire harness according to claim 1, wherein
a plurality of the electrical wires are parallelly arranged with a space therebetween.

5. The wire harness according to claim 1, wherein
the electrical wire is fixed to the sheet by sewing or welding.

* * * * *